(12) United States Patent
Zhao

(10) Patent No.: US 8,989,752 B2
(45) Date of Patent: Mar. 24, 2015

(54) BASE STATION FOR IMPLEMENTING INTER-CELL INTERFERENCE COORDINATION AND METHOD FOR INTER-CELL INTERFERENCE COORDINATION

(75) Inventor: Gang Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 264 days.

(21) Appl. No.: 13/257,923

(22) PCT Filed: Apr. 27, 2010

(86) PCT No.: PCT/CN2010/072252
§ 371 (c)(1),
(2), (4) Date: Jun. 11, 2012

(87) PCT Pub. No.: WO2010/148768
PCT Pub. Date: Dec. 29, 2010

(65) Prior Publication Data
US 2012/0244871 A1     Sep. 27, 2012

(30) Foreign Application Priority Data

Dec. 29, 2009  (CN) .......................... 2009 1 0238805

(51) Int. Cl.
*H04W 40/00*     (2009.01)
*H04W 52/24*     (2009.01)
(Continued)

(52) U.S. Cl.
CPC ............ *H04W 52/243* (2013.01); *H04W 16/30* (2013.01); *H04W 52/143* (2013.01); *H04W 16/10* (2013.01); *H04W 72/082* (2013.01)
USPC ........... 455/448; 370/328; 455/418; 455/421; 455/446

(58) Field of Classification Search
CPC ... H04W 16/10; H04W 16/30; H04W 52/143; H04W 52/243; H04W 72/082
USPC .................... 455/418–420, 421, 422.1–426.2, 455/446–449; 370/328–338
See application file for complete search history.

(56) References Cited

U.S. PATENT DOCUMENTS

2004/0127223 A1* 7/2004 Li et al. ......................... 455/446
2006/0094363 A1  5/2006 Kang et al.
(Continued)

FOREIGN PATENT DOCUMENTS

CN      101242640 A     8/2008
CN      101420746 A     4/2009
(Continued)

OTHER PUBLICATIONS

Texas Instruments, Inter-Cell Interference Mitigation for EUTRA, 3GPP TSG RAN WG1, R1-051059, Oct. 14, 2005. (8 pages).
(Continued)

*Primary Examiner* — Quan M Hua
(74) *Attorney, Agent, or Firm* — Oppedahl Patent Law Firm LLC

(57) ABSTRACT

The present disclosure discloses a method for inter-cell interference coordination, which includes: classifying users in a cell into cell-edge users and cell-center users and allocating frequency resources to the cell-edge users and the cell-center users; acquiring the interference level of the frequency resources in the cell according to inter-cell interference and recording the changing trend of the interference caused by a neighboring cell on the cell; and coordinating the inter-cell interference according to the interference level of the frequency resources in the cell and the changing trend of the interference caused by the neighboring cell on the cell. The present disclosure further discloses a base station for implementing inter-cell interference coordination. The present disclosure can effectively lower the level of inter-cell interference to an ideal balanced state and improve the service capability of a base station.

6 Claims, 8 Drawing Sheets

(51) Int. Cl.
*H04W 16/10* (2009.01)
*H04W 16/30* (2009.01)
*H04W 52/14* (2009.01)
*H04W 72/08* (2009.01)

(56) References Cited

U.S. PATENT DOCUMENTS

| | | | |
|---|---|---|---|
| 2007/0004423 A1* | 1/2007 | Gerlach et al. | 455/452.2 |
| 2007/0141995 A1* | 6/2007 | Youn et al. | 455/69 |
| 2008/0057932 A1* | 3/2008 | Brunner | 455/422.1 |
| 2009/0129401 A1 | 5/2009 | Kang et al. | |
| 2009/0201867 A1* | 8/2009 | Teo et al. | 370/329 |

FOREIGN PATENT DOCUMENTS

| | | |
|---|---|---|
| CN | 101505495 A | 8/2009 |
| EP | 1653762 A2 | 5/2006 |
| EP | 1775978 A1 | 4/2007 |
| JP | 2009171288 A | 7/2009 |
| WO | 2009067842 A1 | 6/2009 |

OTHER PUBLICATIONS

International Search Report in international application No. PCT/CN2010/072252, mailed on Oct. 21, 2010.

English Translation of the Written Opinion of the International Search Authority in international application No. PCT/CN2010/072252, mailed on Oct. 21, 2010.

Supplementary European Search Report in European application No. 10791274.3, mailed on Sep. 22, 2014. (6 pages—see entire document).

* cited by examiner

__US 8,989,752 B2__

BASE STATION FOR IMPLEMENTING INTER-CELL INTERFERENCE COORDINATION AND METHOD FOR INTER-CELL INTERFERENCE COORDINATION

TECHNICAL FIELD

The present disclosure relates to the field of wireless communications and in particular to a base station for implementing inter-cell interference coordination and a method for inter-cell interference coordination.

BACKGROUND

Orthogonal Frequency Division Multiplexing (OFDM), the mark of a new generation of wireless communication technology, manifests more and more superiorities in wireless communication systems and is adopted by multiple standards. The primary technical advantages of an OFDM system lie in high spectrum efficiency, excellent bandwidth expansibility, high resistance to multi-path fading and a capability of facilitating the flexible distribution of spectrum resources and the realization of space diversity technologies such as Multi-Input Multi-Output (MIMO) technology.

Like a conventional wireless cellular network, an OFDM system increases a spectrum utilization rate by lowering a frequency multiplexing factor. In an OFDM system, although the interference inside a cell is perfectly eliminated, Inter-Cell Interface is increased with the decrease of a frequency multiplexing factor as common-frequency interference sources get closer.

SUMMARY

It is an object of the present disclosure to provide a base station for implementing inter-cell interference coordination and a method for inter-cell interference coordination, which are capable of lowering the level of inter-cell interference in an OFDM system accurately and timely and improving the service capability of the system.

A method for inter-cell interference coordination is provided in the present disclosure, including:

classifying users in a cell into cell-edge users and cell-center users, and allocating frequency resources for the cell-edge users and the cell-center users;

acquiring an interference level of frequency resources in the cell according to inter-cell interference, recording a changing trend of interference caused by a neighboring cell on the cell; and coordinating inter-cell interference according to the interference level of the frequency resources in the cell and the changing trend of the interference caused by the neighboring cell on the cell.

Preferably, the classifying users in a cell into cell-edge users and cell-center users and allocating frequency resources to the cell-edge users and the cell-center users may further include:

dividing the frequency resources in the cell into a plurality of resource subsets, allocating one resource subset to each cell-edge user and allocating remaining resource subsets to the cell-center users, wherein the number of the resource subsets is not smaller than that of sectors in the cell.

Preferably, the coordinating inter-cell interference may further include:

calculating a load of the cell and comparing the load of the cell with a predetermined cell load threshold;

adjusting the resource subsets in the cell when the load of the cell is not greater than the predetermined cell load threshold;

or adjusting the resource subsets in the cell and a power upper limit difference between the resource subsets corresponding to the users in the cell when the load of the cell is greater than the predetermined cell load threshold.

Preferably, the adjusting the resource subsets in the cell when the load of the cell is not greater than the predetermined cell load threshold specifically may be:

allocating, when an interference level of a resource subset allocated to a user is higher than a predetermined interference level threshold of the resource subset, a resource subset with an interference level lower than the predetermined interference level threshold to the user corresponding to the resource subset with an interference level higher than the predetermined interference level threshold.

Preferably, the adjusting the resource subsets in the cell and a power upper limit difference between the resource subsets corresponding to the users in the cell when the load of the cell is greater than the predetermined cell load threshold specifically may be:

allocating, when an interference level of a resource subset allocated to a user is higher than a predetermined interference level threshold of the resource subset, a resource subset with an interference level lower than the predetermined interference level threshold to the user corresponding to the resource subset with an interference level higher than the predetermined interference level threshold;

and adjusting a power upper limit difference between the resource subsets corresponding to the cell-center users and the cell-edge users in the cell according to a changing trend of interference caused by cell-center users of the neighboring cell on the cell and a changing trend of interference caused by cell-edge users of the neighboring cell on the cell.

A base station for implementing inter-cell interference coordination is also provided in the present disclosure, which includes: a user type classification module, an interference level processing module, a power control module and a resource control module, wherein the user type classification module is configured to classify users in a cell into cell-center users and cell-edge users;

the interference level processing module is configured to allocate frequency resources to the cell-edge users and the cell-center users, acquire an interference level of the frequency resources in the cell according to inter-cell interference, and record a changing trend of interference caused by a neighboring cell on the cell;

the resource control module is configured to adjust the frequency resources allocated to the users in the cell according to the interference level of the frequency resources in the cell;

and the power control module is configured to adjust a power upper limit difference between resource subsets of the users in the cell according to the changing trend of the interference caused by the neighboring cell on the cell.

Preferably, the interference level processing module may be further configured to divide the frequency resources in the cell into a plurality of resource subsets and allocating one resource subset to each cell-edge user and allocate remaining resource subsets to the cell-center users, wherein the number of the resource subsets is not smaller than that of sectors in the cell.

Preferably, the interference level processing module may be further configured to predetermine an interference level threshold for the resource subsets and comparing an interference level of a resource subset with the interference level threshold.

Preferably, the resource control module may be further configured to allocate a resource subset with an interference level lower than the interference level threshold to a user corresponding to a resource subset with an interference level higher than the interference level threshold.

Preferably, the base station may further include a load calculation module configured to predetermine a cell load threshold and compare a load of the cell with the predetermined cell load threshold.

Preferably, the power control module may be further configured to adjust a power upper limit difference between the resource subsets corresponding to the cell-center users and the cell-edge users in the cell according to a changing trend of interferences caused by cell-center users of the neighboring cell on the cell and a changing trend of interferences caused by cell-edge users of the neighboring cell on the cell when the load of the cell is greater than the cell load threshold.

As a resource subset with a low interference level is allocated to a user in a cell by the resource control module, and a power upper limit difference between the resource subsets of the users in the cell is adjusted by the power control module according to a changing trend of interference caused by a neighboring cell on the cell, the base station and method for inter-cell interference coordination provided herein effectively lower the level of inter-cell interference and control the level of inter-cell interference at an ideal balanced state, and the service capability of the base station is effectively improved.

DETAILED DESCRIPTION

The present disclosure is described below in detail by reference to accompanying drawings in combination with specific embodiments.

In order to lower the level of inter-cell interference to an ideal balanced state, a base station provided herein is additionally configured with a resource control module for adjusting frequency resources allocated to users in a cell and a power control module for adjusting a power upper limit difference between resource subsets of the users in the cell.

Figure 1:
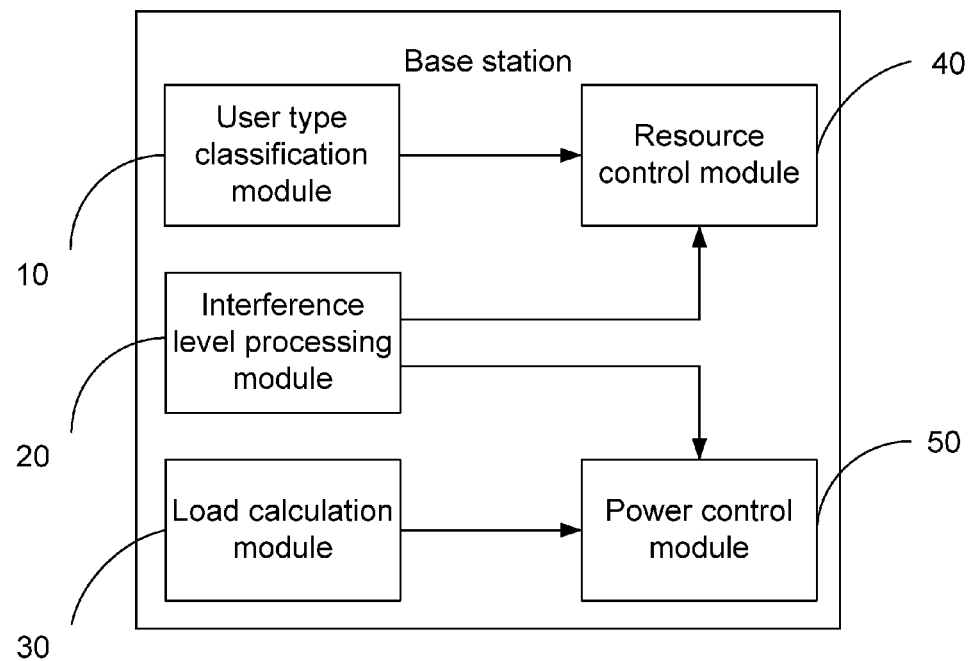
FIG. 1 is a schematic diagram illustrating the structure of a base station for implementing inter-cell interference coordination according to the present disclosure.

In an embodiment of the preset disclosure, there is provided a base station which is capable of implementing inter-cell interference coordination and specifically comprises, as shown in FIG. 1, a user type classification module 10, an interference level processing module 20, a load calculation module 30, a resource control module 40 and a power control module 50.

The user type classification module 10 is used for classifying user types in a cell thus classifying users in each cell into cell-edge users and cell-center users. In a cell, an area where cell-edge users are located is referred to as an edge area and an area where cell-center users are located is referred to as a center area; referring to FIG. 3, each cell comprises three sectors, each of which is represented by a large hexagon shown in this figure, and in each sector, a shadow part a forms an edge area, and a small hexagonal area b in the middle forms a center area.

Figure 3:
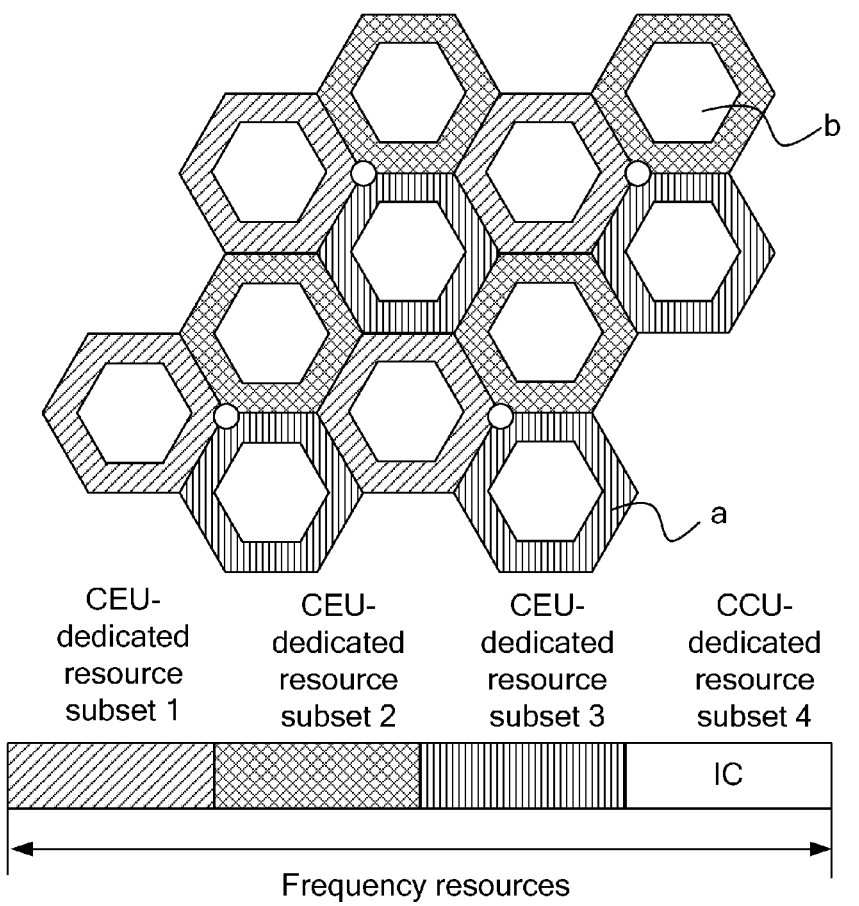
FIG. 3 is a schematic diagram illustrating user classification and frequency resource distribution in a cell according to the present disclosure.
Figure 4:
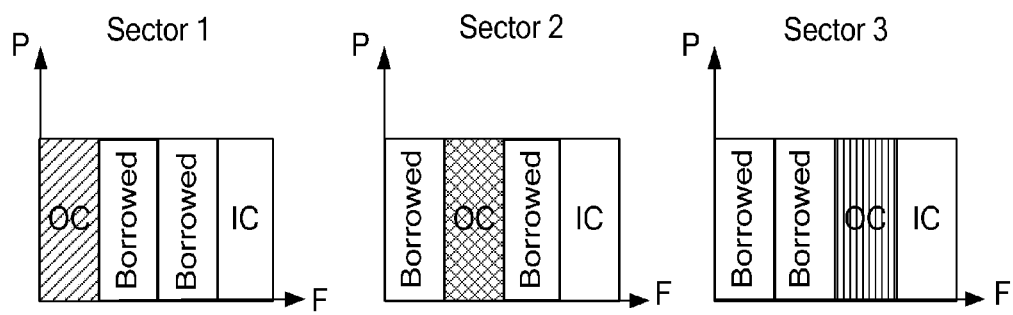
FIG. 4 is a schematic diagram illustrating the manner of frequency resource division in a cell according to the present disclosure.

The interference level processing module 20 is used for dividing all the frequency resources in each cell into a plurality of resource subsets, allocating one resource subset to each cell-edge user in each sector and allocating remaining resource subsets to the cell-center users in the cell; referring to FIG. 3, the resource subsets allocated to the cell-edge users can also act as borrowed resources to serve the cell-center users (referring to FIG. 4).

The interference level processing module 20 is further used for acquiring, according to inter-cell interference, an interference level of a resource subset in the cell corresponding to the inter-cell interference.

Figure 2:
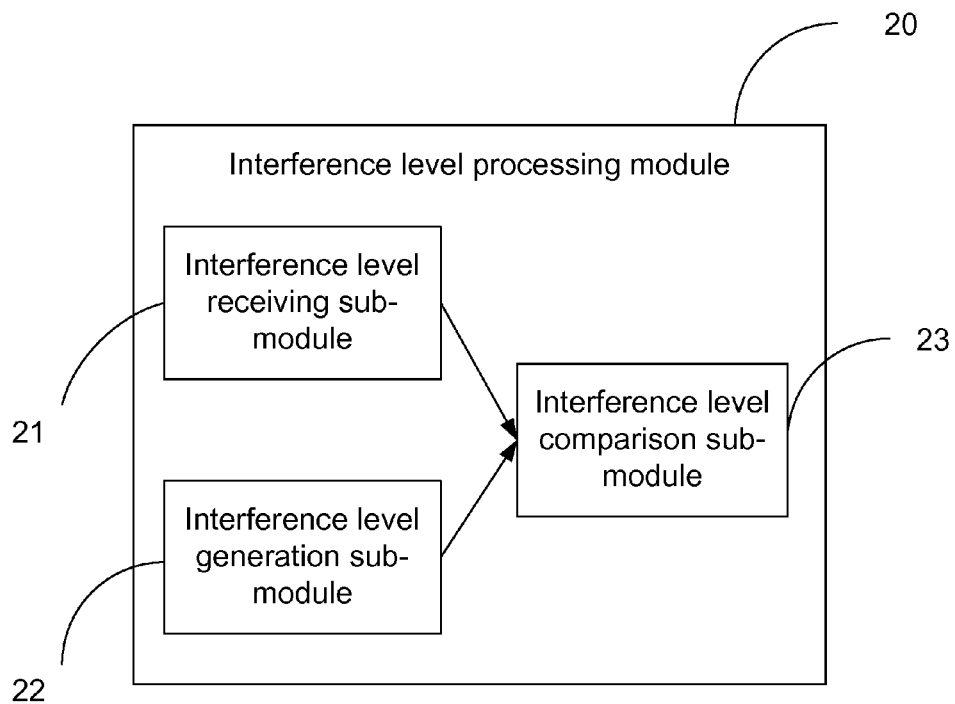
FIG. 2 is a schematic diagram illustrating the structure of an interference level processing module configured in the base station according to the present disclosure.

Referring to FIG. 2, the interference level processing module 20 further comprises an interference level receiving sub-module 21, an interference level generation sub-module 22 and an interference level comparison sub-module 23, wherein the interference level receiving sub-module 21 is used for receiving interference level information from a neighboring cell, finding a corresponding resource subset according to the received interference level information, acquiring an interference level of the found resource subset, and sending the interference level to the interference level comparison sub-module 23, wherein the interference level comprises: an interference level value NIL of a resource subset corresponding to interference caused by the neighboring cell on the cell, and an interference level value SIL of a resource subset corresponding to interference caused by the cell on the neighboring cell.

The interference level generation sub-module 22 is used for finding a corresponding resource subset according to interference caused by the cell on the neighboring cell and acquiring an interference level value SIL of the resource subset; for finding a corresponding resource subset according to interference caused by the neighboring cell on the cell and acquiring an interference level value NIL of the resource subset, and sending the SIL and the NIL to the interference level comparison sub-module 23.

The interference level comparison sub-module 23, in which an interference level threshold SIL_thd is predetermined for a resource subset corresponding to interference caused by the cell on a neighboring cell and an interference level threshold NIL_thd is predetermined for a resource subset corresponding to interference caused by a neighboring cell on the cell, is used for comparing current SIL with the SIL-thd and current NIL with the NIL_thd to generate a comparison result.

The interference level processing module 20 feeds the comparison result back to the resource control module 40.

The interference level processing module 20 is further used for recording a changing trend of interference caused by neighboring cell-center users on the cell and a changing trend of interference caused by neighboring cell-edge users on the cell, and feeding a record result back to the power control module 50.

The load calculation module 30 is used for predetermining a cell load threshold, calculating a load of the cell, comparing the load of the cell with the cell load threshold, and sending a comparison result to the power control module 50.

The power control module 50 is used for adjusting a power upper limit difference between the resource subsets corresponding to the cell-center users and the cell-edge users in the cell according to a changing trend of interference caused by the cell-center users in the neighboring cell on the cell and a changing trend of interference caused by the cell-edge users of the neighboring cell on the cell. The power control module 50 adjusts the power upper limit difference between the resource subsets corresponding to the cell-center users and the cell-edge users in the cell in the case where the load of the cell is greater than the cell load threshold; or it only adjusts resource subsets allocated to the users in the cell without need of adjusting the above-mentioned power upper limit difference in the case where the load of the cell is not greater than the cell load threshold. The power control module 50 adjusts the power upper limit difference between the resource subsets corresponding to the cell-center users and the cell-edge users in the cell in the following specific eight ways:

increasing the power upper limit difference between the resource subsets corresponding to the cell-center users and the cell-edge users in the cell by a small step in the case where interference caused by the cell-center users in the neighboring cell on the cell increases faster than that caused by the cell-edge users in the same neighboring cell on the cell;

decreasing the power upper limit difference between the resource subsets corresponding to the cell-center users and the cell-edge users in the cell by a small step in the case where interference caused by the cell-center users in the neighboring cell on the cell increases slower than that caused by the cell-edge users in the same neighboring cell on the cell;

remaining the power upper limit difference between the resource subsets corresponding to the cell-center users and the cell-edge users in the cell unchanged in the case where interference caused by the cell-center users in the neighboring cell on the cell increases as fast as interference caused by the cell-edge users in the neighboring cell on the cell;

decreasing the power upper limit difference between the resource subsets of the cell-center users and the cell-edge users in the cell by a small step in the case where interference caused by the cell-center users in the neighboring cell on the cell decreases faster than that caused by the cell-edge users in the same neighboring cell on the cell;

increasing the power upper limit difference between the resource subsets of the cell-center users and the cell-edge users in the cell by a small step in the case where interference caused by the cell-center users in the neighboring cell on the cell decreases more slowly than that caused by the cell-edge users in the same neighboring cell on the cell;

remaining the power upper limit difference between the resource subsets of the cell-center users and the cell-edge users in the cell unchanged in the case where interference caused by the cell-center users in the neighboring cell on the cell decreases almost as fast as that caused by the cell-edge users in the same neighboring cell on the cell;

increasing the power upper limit difference between the resource subsets of the cell-center users and the cell-edge users in the cell by a small step in the case where cell-center users in the neighboring cell cause interference on the cell at an increasing speed and the cell-edge users in the same neighboring cell cause interference on the cell at a decreasing speed, and decreasing the power upper limit difference between the resource subsets of the cell-center users and the cell-edge users in the cell by a small step in the case where the cell-center users in the neighboring cell cause interference on the cell at a decreasing speed and the cell-edge users in the same neighboring cell cause interference on the cell at an increasing speed.

The resource control module 40 is used for adjusting the resource subsets allocated to the users in the cell according to the result of comparison of an interference level of a resource subset in the cell with the predetermined interference level threshold, and allocating a resource subset with an interference level lower than the predetermined interference level threshold to a user corresponding to a resource subset with an interference level higher than the predetermined interference level.

Figure 5:
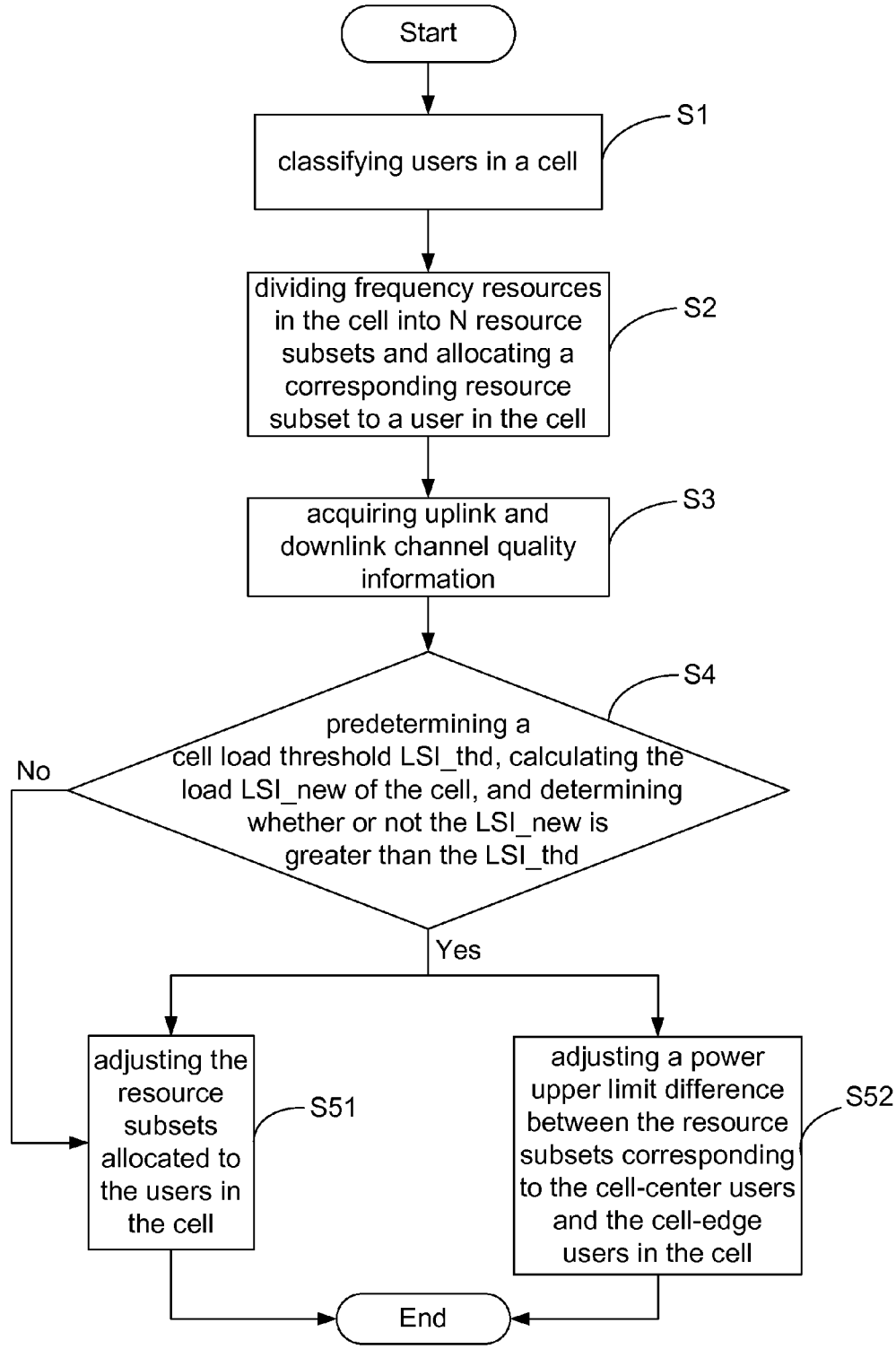
FIG. 5 is a flow chart of a method for inter-cell interference coordination according to the present disclosure.
Figure 6:
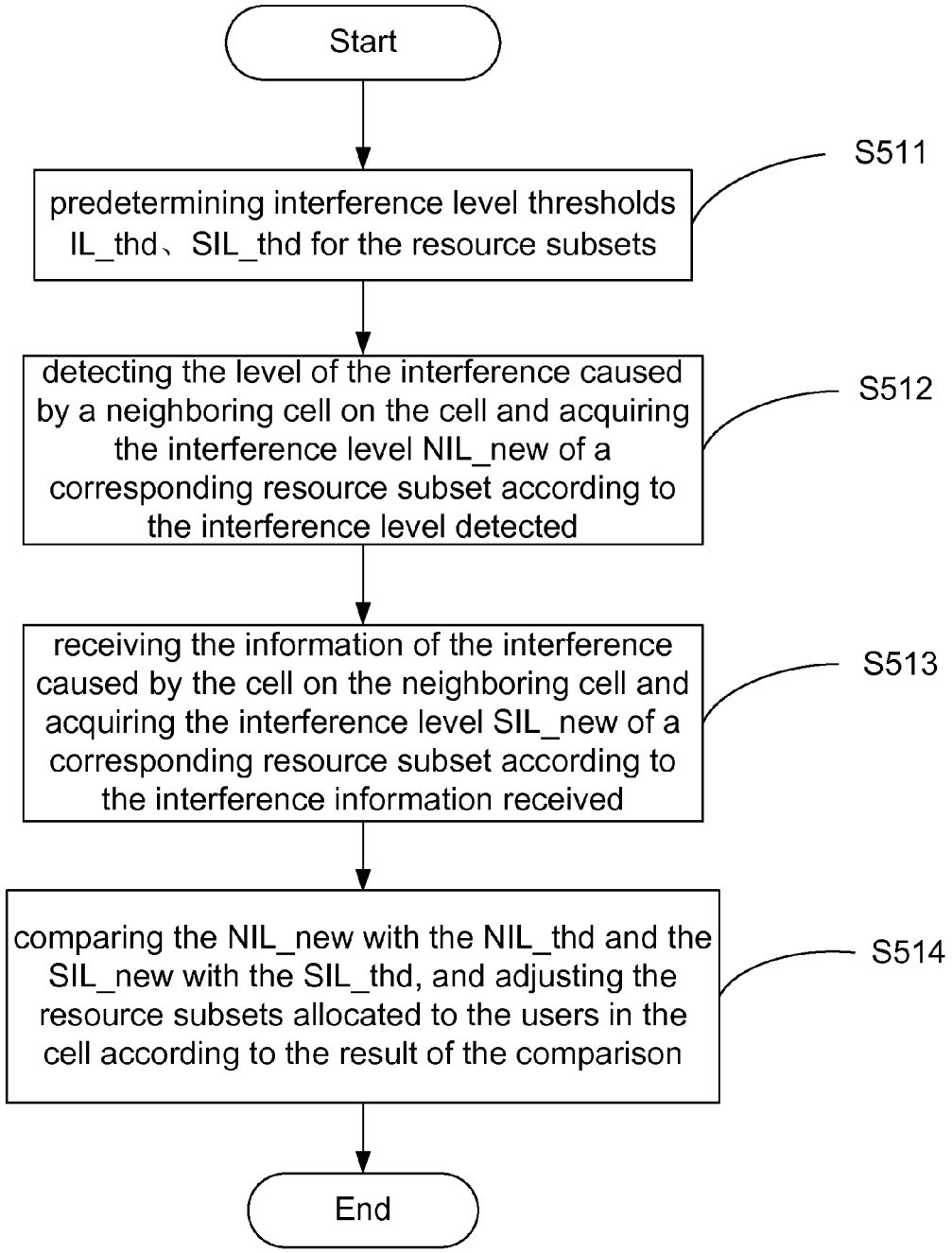
FIG. 6 is a flow chart of a method for adjusting resource subsets in a cell according to the present disclosure.
Figure 7:
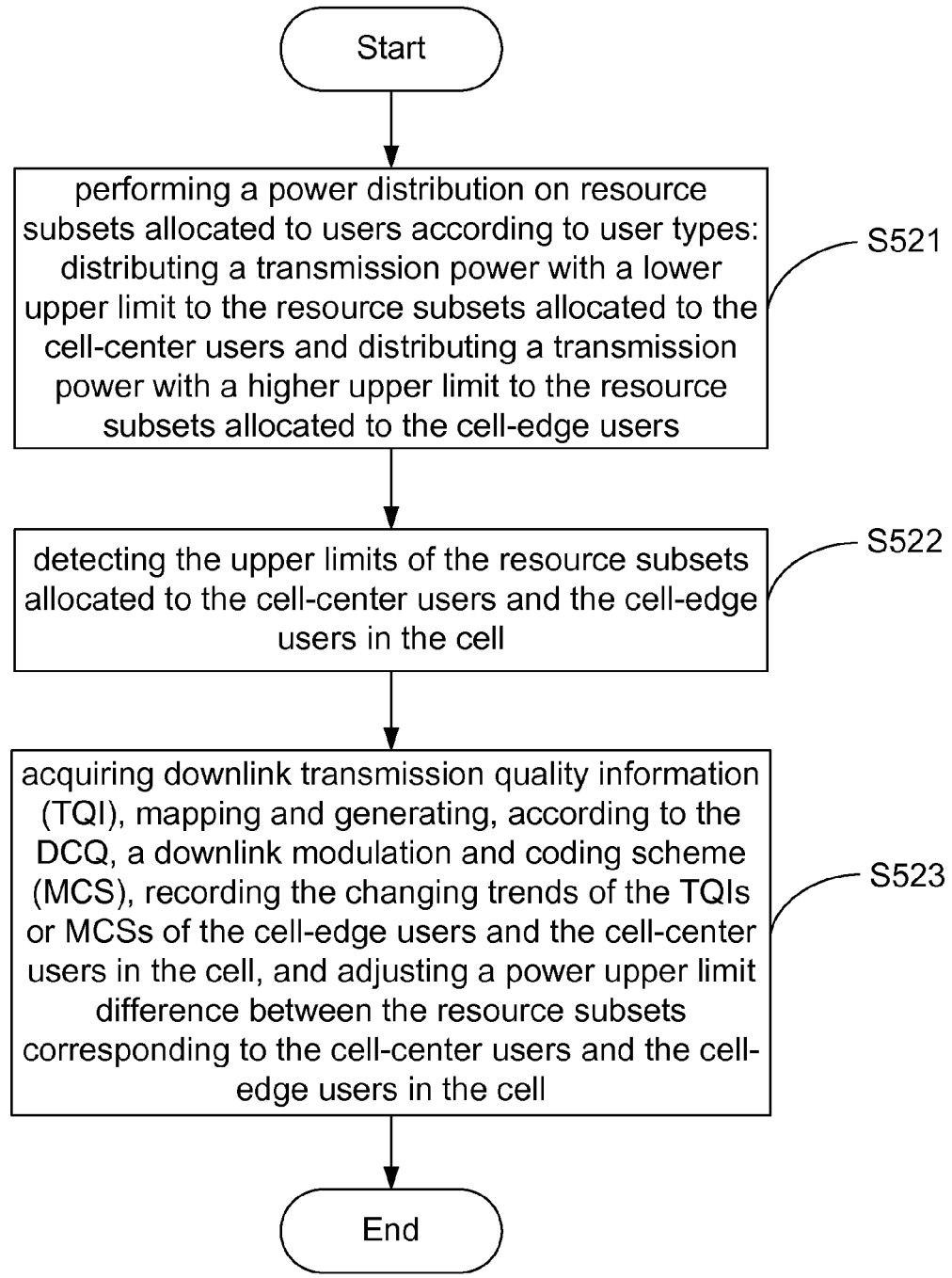
FIG. 7 is a flow chart of a method for performing a power adjustment on resource subsets in a cell according to the present disclosure.

In order to decrease inter-cell interference, a method provided herein adjusts resource subsets that are used by users in a cell and adjusts a power upper limit difference between resource subsets in the cell; and referring to FIG. 5, this method specifically comprises the following steps:

step S1: classifying users in a cell;

wherein user types include cell-edge user and cell-center user; an area where cell-edge users are located is referred to as an edge area OC, and an area where cell-center users are located is referred to as a center area IC;

step S2: dividing frequency resources in the cell into N resource subsets and allocating a corresponding resource subset to a user in the cell;

wherein the number of sectors in the cell is M, and N≥M; the format of the N resource subsets is: {Subset 1, Subset 2, RB Set3, . . . , RB Set N}, and the resource subsets are not overlapped with each other; the resource subset number N can be flexibly set; M resource subsets are selected from the N resource subsets as dedicated frequency resources FR_edge of the cell-edge users (CEU) in the M sectors while the remaining N-M resource subsets serve as dedicated frequency resources FR_center of all the cell-center users (CCU) in the cell; and edge-dedicated resources in a neighboring cell can serve the cell as borrowed resources FR_borrow. Cell-edge users can only use edge-dedicated resources FR_edge of a cell while cell-center users can use all the resources except those occupied by cell-edge users, including the center-dedicated resources FR_center of the cell, the edge-dedicated resources FR_edge of the cell, and the borrowed resources FR_borrow of the cell; each cell may have no center-dedicated resources FR_center, that is, cell-center users in a cell can all use borrowed resources;

step S3: acquiring uplink and downlink channel quality information;

wherein a terminal measures and reports Downlink Channel Quality (DCQ), and a base station measures Uplink Channel Quality (UCQ); wherein the DCQ comprises a Carrier To Interference Plus Noise Ratio (CINR), a Signal To Interference Plus Noise Ratio (SINR), a Signal To Interference Ratio (SIR) and a SIGNAL TO NOISE RATIO (SNR) and so on; and the UCQ comprises an SINR, a CINR, an SIR and an SNR;

step S4: predetermining a cell load threshold LSI_thd, calculating a cell load LSI_new, and determining whether or not the LSI_new is greater than the LSI_thd;

in the case where the LSI _new is greater than LSI _thd, it represents that the cell load LSI_new is larger, it is necessary to adjust the resource subsets allocated to the users in the cell and a power upper limit difference between the users in the cell using the resource subsets, that is, the flow turns to step S51 to adjust the resource subsets allocated to the users in the cell, at the same time turns to S52 to adjust a power upper limit difference between the cell-center users and the cell-edge users in the cell using the resource subsets;

in the case where the LSI _new is not greater than the LSI _thd, it represents that the cell load LSI_new is smaller, it is only necessary to adjust the resource subsets allocated to the users in the cell, that is, it is only necessary to directly turn to step S51 to adjust the resource subsets allocated to the users in the cell;

step S51: adjusting the resource subsets allocated to the users in the cell; referring to FIG. 6, this step further comprises the following steps:

step S511: predetermining interference level thresholds NIL_thd, SIL_thd for the resource subsets, wherein the NIL_thd represents the interference level threshold of a resource subset corresponding to interference caused by a neighboring cell on the cell, and the SIL_thd represents the interference level threshold of a resource subset corresponding to interference caused by the cell on a neighboring cell;

step S512: detecting the level of interference caused by a neighboring cell on the cell and acquiring an interference level NIL_new of a corresponding resource subset according to the interference level detected;

step S513: receiving information of interference caused by the cell on the neighboring cell and acquiring an interference level SIL_new of a corresponding resource subset according to the interference information received;

step S514: comparing the NIL_new with the NIL_thd and the SIL_new with the SIL_thd, and adjusting the resource subsets allocated to the users in the cell according to comparison results, wherein when NIL_new is greater than NIL_thd, it represents that the interference level of the resource subset corresponding to the interference caused by the neighboring cell on the cell is high;

when NIL_new is not greater than NIL_thd, it represents that the interference level of the resource subset corresponding to the interference caused by the neighboring cell on the cell is low;

when SIL_new is greater than SIL_thd, it represents that the interference level of the resource subset corresponding to the interference caused by the cell on the neighboring cell is high;

and when the SIL_new is not greater than the SIL_thd, it represents that the interference level of the resource subset corresponding to the interference caused by the cell on the neighboring cell is low;

when needing to initiate a service, a cell-center user calls a resource subset allocated to itself when an interference level of a resource subset corresponding to the cell-center user is low, or calls a CEU-dedicated resource subset in the cell if the interference level of the resource subset allocated to itself is high, or calls a borrowed resource subset, which refers to an edge-dedicated resource subset of a neighboring cell, when the interference level of the CEU-dedicated resource subset in the cell is high;

when the interference level of the resource subsets corresponding to the cell-edge users is greater than the predetermined interference level threshold, then the ratio of the cell-center users to the cell-edge users in the cell is readjusted, or resource subsets are re-allocated to the cell-center users and the cell-edge users, that is: resource subsets with an interference level lower than the predetermined interference level threshold are allocated to the cell-edge users, and resource subsets with an interference level higher than the predetermined interference level threshold are allocated to the cell-center users, because the cell-center users can call other resource subsets with an interference level lower than the predetermined interference level threshold while the cell-edge users can only call their own edge-dedicated resource subsets; and step S52: adjusting a power upper limit difference between the resource subsets corresponding to the cell-center users and the cell-edge users in the cell; referring to FIG. 7, this step specifically comprises the following steps:

step S521: performing a power distribution on resource subsets allocated to users according to user types: distributing a transmission power with a relatively low upper limit to resource subsets allocated to cell-center users and a transmission power with a relatively high upper limit to resource subsets allocated to cell-edge users;

step S522: detecting upper limits of the resource subsets allocated to the cell-center users and the cell-edge users in the cell; and step S523: acquiring downlink Transmission Quality Information (TQI), mapping and generating a downlink Modulation And Coding Scheme (MCS) according to the DCQ, recording changing trends of the TQIs or MCSs of the cell-edge users and the cell-center users in the cell, and accordingly adjusting the power upper limit difference between the resource subsets corresponding to the cell-center users and the cell-edge users in the cell, wherein the downlink transmission quality information comprises a Block Error Ratio (BLER), a Packet Error Ratio (PER) and a Bit Error Ratio (BER) and other information;

it represents, when the TQI of cell-edge users lowers continuously or the MCS of the cell-edge users grows continuously under an external adjustment, that the interference caused by cell-center users of a neighboring cell on the cell is decreased;

it represents, when the TQI of cell-edge users grows continuously or the MCS of the cell-edge users lowers continuously under an external adjustment, that the interference caused by cell-center users of a neighboring cell on the cell is increased;

it represents, when the TQI of cell-center users lowers continuously or the MCS of the cell-center users grows continuously under an external adjustment, that the interference caused by cell-edge users of a neighboring cell on the cell is decreased;

it represents, when the TQI of cell-center users grows continuously or the MCS of the cell-center users lowers continuously under an external adjustment, that the interference caused by cell-edge users of a neighboring cell on the cell is increased;

the adjusting a power upper limit difference between users using frequency resources in the cell according to the changes of the TQI or MCS of the cell-edge users and the cell-center users in the cell comprises:

increasing the power upper limit difference between the resource subsets corresponding to the cell-center users and the cell-edge users in the cell by a small step in the case where interference caused by the cell-center users in the neighboring cell on the cell increases faster than that caused by the cell-edge users in the same neighboring cell on the cell;

decreasing the power upper limit difference between the resource subsets corresponding to the cell-center users and the cell-edge users in the cell by a small step in the case where interference caused by the cell-center users in the neighboring cell on the cell increases slower than that caused by the cell-edge users in the same neighboring cell on the cell;

remaining the power upper limit difference between the resource subsets corresponding to the cell-center users and the cell-edge users in the cell unchanged in the case where interference caused by the cell-center users in the neighboring cell on the cell increases as fast as that caused by the cell-edge users in the same neighboring cell cause interference on the cell;

decreasing the power upper limit difference between the resource subsets of the cell-center users and the cell-edge users in the cell by a small step in the case where interference caused by the cell-center users in the neighboring cell on the cell decreases faster than that caused by the cell-edge users in the same neighboring cell on the cell;

increasing the power upper limit difference between the resource subsets of the cell-center users and the cell-edge users in the cell by a small step in the case where interference caused by the cell-center users in the neighboring cell on the cell decreases more slowly than that caused by the cell-edge users in the same neighboring cell on the cell;

remaining the power upper limit difference between the resource subsets of the cell-center users and the cell-edge users in the cell unchanged in the case where interference caused by the cell-center users in the neighboring cell decreases almost as fast as that caused by the cell-edge users in the same neighboring cell on the cell;

increasing the power upper limit difference between the resource subsets corresponding to the cell-center users and the cell-edge users in the cell by a small step in the case where the cell-center users in the neighboring cell cause interference on the cell at an increasing speed and the cell-edge users in the same neighboring cell cause interference on the cell at a decreasing speed, and decreasing the power upper limit difference between the resource subsets of the cell-center users and the cell-edge users in the cell by a small step in the case where the cell-center users in the neighboring cell cause interference on the cell at a decreasing speed and the cell-edge users in the same neighboring cell cause interference on the cell at an increasing speed, wherein the power upper limit difference between the resource subsets corresponding to the cell-center users and the cell-edge users in the cell is adjusted at a relatively low speed.

Figure 8:
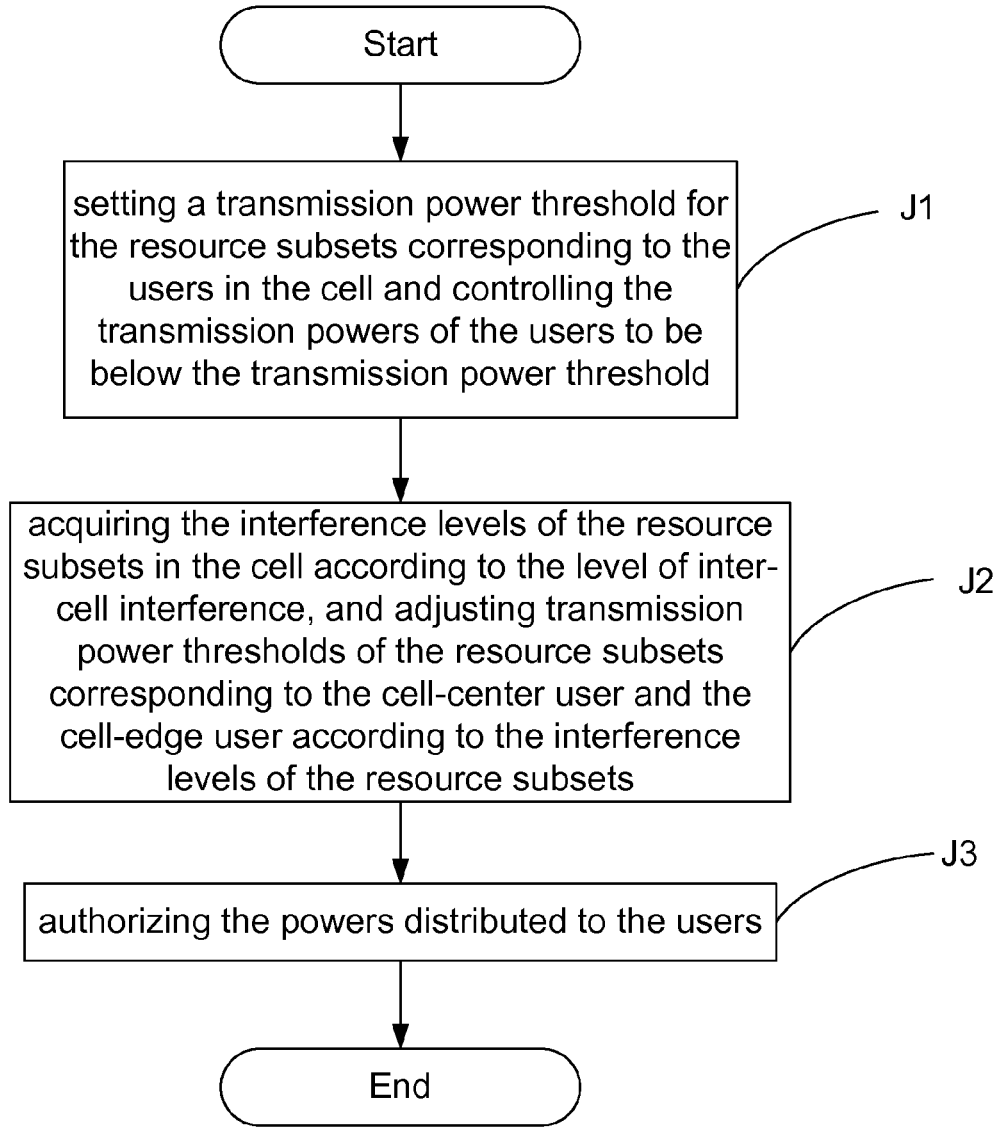
FIG. 8 is a flow chart of a method for performing an uplink power control on a cell according to the present disclosure.

In order to control inter-cell interference level better, the method for inter-cell interference coordination provided herein further performs an uplink power control on the cell while adjusting the power upper limit difference between the users using resource subsets in the cell; referring FIG. 8, the uplink power control comprises the following steps:

step J1: setting a transmission power threshold for resource subsets corresponding to the users in the cell, and controlling transmission powers of the users to be below the transmission power threshold;

wherein the upper limit of transmission powers of the cell-edge users in the cell is smaller than that of transmission powers of the cell-center users in the cell;

step J2: acquiring interference levels of the resource subsets in the cell according to an inter-cell interference level, and adjusting transmission power thresholds of the resource subsets corresponding to the cell-center users and the cell-edge users according to the interference levels of the resource subsets; and step J3: authorizing powers distributed to the users, wherein the sum of transmission powers of multiple resource subsets is smaller than or equal to the upper limit of the total power the users can transmit.

Figure 9:
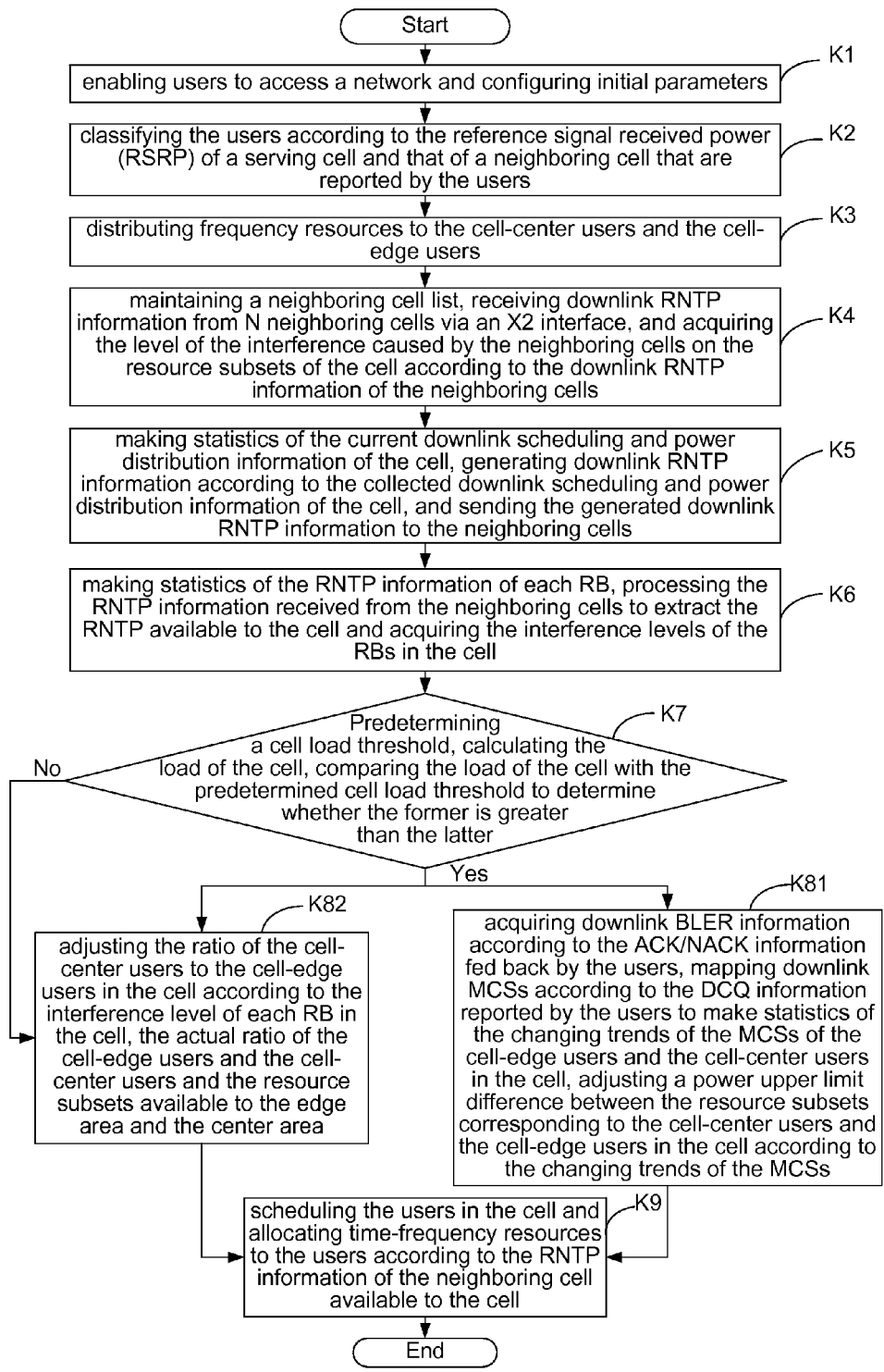
FIG. 9 is a flow chart of a method for uplink semi-static interference coordination in a long term evolution (LTE) system according to the present disclosure.

In an embodiment of the present disclosure, a method for performing downlink semi-static interference coordination in an LTE system comprises four processes: classifying users in a cell, dividing frequency resources of the cell, adjusting resource subsets allocated to the users based on the level of inter-cell interference, and adjusting a power upper limit difference between the resource subsets based on the level of inter-cell interference; referring to FIG. 9, this method specifically comprises the following steps:

step K1: enabling users to access a network and configuring initial parameters;

step K2: classifying users according to Reference Signal Received Power (RSRP) of a serving cell and that of a neighboring cell which are reported by the users;

the user types include CCU and CEU, and there are provided two methods for classifying users according to RSRP:

method 1: determining UE to be a CEU when $RSRP_{servering} - P_{neighbor} < Threshold_1$ is satisfied, otherwise, determining the UE to be a CCU; and method 2: determining UE to be a CEU when $$RSRP_{servering} - \sum_{i=1}^{N_{neighboring\ cell}} RSRP_{neighbor\_i} < Threshold_2$$

is satisfied, otherwise, determining the UE to be a CCU;

wherein the users can also be classified according to a loss difference between a path from UE and to the serving cell and a path from the UE to a neighboring cell and according to channel quality information of the UE;

and step K3: distributing frequency resources to cell-center users and the cell-edge users;

in this step, the frequency resources can be distributed to cell-center users and the cell-edge users in the way shown in FIG. 4, in which, with an example of three sectors, the frequency resources are divided into four resource subsets, three of which are respectively allocated as dedicated resource subsets of the cell-edge users of the three sectors, and the rest of which is allocated as a dedicated resource subset of the cell-center users in the cell; the cell-center users in the cell can borrow CEU-dedicated resource subsets unoccupied by the cell-edge users in the cell and all the CEU-dedicated resource subsets of a neighboring cell, that is, resource subsets dedicated to cell-edge users can be provided to cell-center users as borrowed resource subsets;

step K4: maintaining a neighboring cell list, receiving downlink RNTP information from N neighboring cells via an X2 interface, and acquiring levels of interference caused by the neighboring cells on the resource subsets of the cell according to the downlink RNTP information of the neighboring cells;

the format of the downlink Relative Narrow Transmission Powers (RNTP) of the neighboring cells is {RNTP1, RNTP2, RNTP3, . . . , RNTPn3};

step K5: making statistics of current downlink scheduling and power distribution information of the cell, generating downlink RNTP information according to the collected downlink scheduling and power distribution information of the cell, and sending the generated downlink RNTP information to the neighboring cells;

step K6: making statistics of RNTP information of each resource subset (i.e. RB, resource block), processing the RNTP information received from the neighboring cells to extract RNTP available to the cell and acquiring interference levels of RBs in the cell;

step K7: predetermining a cell load threshold, calculating a load of the cell, comparing the load of the cell with the predetermined cell load threshold to determine whether the former is greater than the latter, if the former is greater than the latter, turning to steps K81 and K82 synchronously, otherwise, turning to step K82 directly;

step K81: acquiring downlink BLER information according to ACK/NACK information fed back by the users, mapping downlink MCSs according to DCQ information reported by the users, making statistics of changing trends of MCSs of the cell-edge users and the cell-center users in the cell, adjusting a power upper limit difference between the resource subsets corresponding to the cell-center users and the cell-edge users in the cell according to the changing trends of the MCSs, and then turning to step K9, wherein the BLER should be kept BLER<=10%; and it represents, when the MCS of the cell-edge users in the cell increases continuously, that interference caused by cell-center users in a neighboring cell on the cell decreases;

this step K81 further comprises the following steps of:

indicating an increase in interference caused by cell-center users in a neighboring cell on the cell when the MCS of the cell-edge users in the cell decreases continuously;

indicating a decrease in interference caused by cell-edge users in a neighboring cell on the cell when the MCS of the cell-center users in the cell increases continuously;

indicating an increase in interference caused by cell-edge users in a neighboring cell on the cell when the MCS of the cell-center users in the cell decreases continuously;

increasing the power upper limit difference between the resource subsets corresponding to the cell-center users and the cell-edge users in the cell by a small step in the case where interference caused by cell-center users in a neighboring cell on the cell increases faster than that caused by cell-edge users in the same neighboring cell on the cell;

decreasing the power upper limit difference between the resource subsets corresponding to the cell-center users and the cell-edge users in the cell by a small step in the case where interference caused by cell-center users in a neighboring cell on the cell increases slower than that caused by cell-edge users in the same neighboring cell on the cell;

remaining the power upper limit difference between the resource subsets corresponding to the cell-center users and the cell-edge users in the cell unchanged in the case where interference caused by cell-center users in a neighboring cell on the cell increases as fast as that caused by cell-edge users in the same neighboring cell on the cell;

decreasing the power upper limit difference between the resource subsets corresponding to the cell-center users and the cell-edge users in the cell by a small step in the case where interference caused by cell-center users in a neighboring cell on the cell decreases faster than that caused by cell-edge users in the same neighboring cell on the cell;

increasing the power upper limit difference between the resource subsets corresponding to the cell-center users and the cell-edge users in the cell by a small step in the case where interference caused by cell-center users in a neighboring cell on the cell decreases more slowly than that caused by cell-edge users in the same neighboring cell on the cell;

remaining the power upper limit difference between the resource subsets corresponding to the cell-center users and the cell-edge users in the cell unchanged in the case where interference caused by cell-center users in a neighboring cell on the cell decreases as fast as that caused by cell-edge users in the same neighboring cell on the cell;

wherein the power upper limit difference between the resource subsets corresponding to the center users and the cell-edge users in the cell is adjusted at a relatively low speed;

step K82: adjusting the ratio of the cell-center users to the cell-edge users in the cell according to an interference level of each RB in the cell, the actual ratio of the cell-edge users to the cell-center users, and resource subsets available to the edge area and resource subsets available to the center area, that is, allocating resource subsets with a high interference level to the cell-center users and those with a low interference level to the cell-edge users in the cell;

or adjusting the ratio of the resource subsets of the cell-center users to those of the cell-edge users in the cell according to the aforementioned information, configuring resource subsets with an interference level higher than the predetermined interference level threshold as CCU-dedicated resource subsets and those with an interference level lower than the predetermined interference level threshold as CEU-dedicated resource subsets, and then turning to step K9, wherein a base station is at a higher speed when performing a resource subset adjustment on a cell than when performing a power adjustment on the cell;

and step K9: scheduling the users in the cell and allocating time-frequency resources to the users according to the RNTP information from neighboring cells which is available to the cell, wherein cell-edge users first call resource subsets in an edge area OC while cell-center users first use resource subsets in an center area IC; when there is no corresponding resource subset in the IC, the cell-center users call resource subsets of the cell-edge users in the cell, and when there is no resource subset available to the cell-edge users in the cell, borrowed resource subsets can be called if allowed by the load of the cell, that is, the cell-edge users first call resource subsets in $OC_{RB}$ and then those in $\overline{HII_{RB}^u}$, and the cell-center users first call resource subsets in $IC_{RB}$, then those in $OC_{RB}$ and finally those in $BC_{RB}$, wherein $OC_{RB}$ represents a set of frequency RBs of the cell-edge users;

$BC_{RB}$ represents a set of frequency RBs the cell-center users can borrow;

$IC_{RB}$ represents a set of frequency RBs of the cell-center users;

$RNTP_{RB}^{cellId}$ represents a set of RBs corresponding to BIT '1' in RNTP sent from a source cell (cellId) to the cell;

$\{cellId_u\}$ represents a set of cellIds of neighboring cells of $UE_u$, then $$RNTP_{RB}^u = \bigcup_{cellId \in \{cellId_u\}} RNTP_{RB}^{cellId};$$

CEU strategy: $OC_{RB} \cup \overline{RNTP_{RB}^u}$, the total number <= the number of elements in $OC_{RB} \cup \overline{RNTP_{RB}^u}$;

CCU strategy: $IC_{RB} \rightarrow OC_{RB} \rightarrow BC_{RB}$;

and CEU strategy: $OC_{RB} \cup \overline{RNTP_{RB}^u}$.

Figure 10:
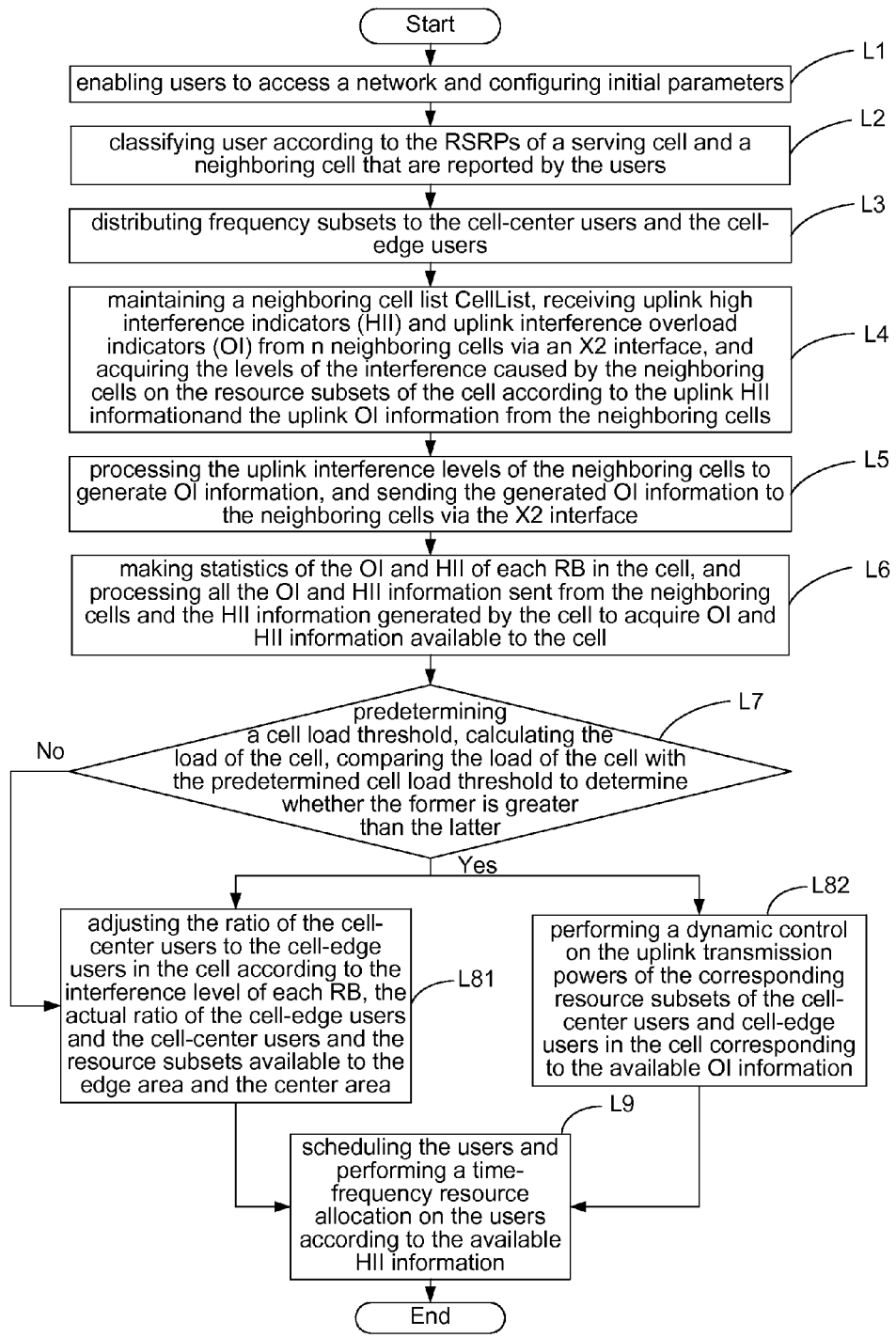
FIG. 10 is a flow chart of a method for downlink semi-static interference coordination in an LTE system according to the present disclosure.

In an embodiment of the present disclosure, a method for performing an uplink semi-static interference coordination in an LTE system comprises four processes of classifying users in a cell, dividing frequency resources of the cell, adjusting resource subsets allocated to the users based on the level of inter-cell interference, and adjusting a power upper limit difference between the resource subsets based on the level of inter-cell interference; referring to FIG. 10, this method specifically comprises the following steps:

step L1: enabling users to access a network and configuring initial parameters;

step L2: classifying user according to RSRP of a serving cell and that of a neighboring cell that are reported by the users, wherein user types include CCU and CEU;

there are provided two methods for classifying user according to RSRP:

a: determining UE to be a CEU when $RSRP_{servering} - RSRP_{neighbor} < Threshold_1$ is satisfied, otherwise, determining the UE to be a CCU; and b: determining UE to be a CEU when $$RSRP_{servering} - \sum_{i=1}^{N_{neighboring\ cell}} RSRP_{neighbor\_i} < Threshold_2$$

satisfied, otherwise, determining the UE to be a CCU;

in addition, the users can also be classified by a base station according to the loss difference between a path from UE to a serving cell and a path from the UE to a neighboring cell, and according to channel quality information of the UE;

step L3: distributing frequency subsets to cell-center users and cell-edge users;

in this step, the frequency resources can be allocated to the cell-center users and the cell-edge users in the way shown in FIG. 4, in which, with an example of three sectors, the frequency resources are divided into four resource subsets, three of which are respectively allocated as dedicated resource subsets of the cell-edge users of the three sectors, and the rest of which is allocated as dedicated resource subsets of the cell-center users in the cell; the cell-center users can borrow CEU-dedicated resource subsets unoccupied by the CEUs in the cell and all the CEU-dedicated resource subsets of a neighboring cell, that is, the edge-dedicated resource subsets of the cell-edge users can be provided to the cell-center users as borrowed resource subsets;

step L4: maintaining a neighboring cell list CellList, receiving uplink High Interference Indicator (HII) information and uplink interference Overload Indicator (OI) information from n neighboring cells via an X2 interface, and acquiring levels of interference caused by the neighboring cells on the resource subsets of the cell according to the uplink HII information and the uplink OI information of the neighboring cells, wherein the format of the HII information is {HII1,HII2, HII3, . . . , HIIn1} and that of the QI information is {OI1, OI2, OI3, . . . , OIn2};

step L5: processing the uplink interference levels of the neighboring cells, generating OI information, and sending the generated OI information to the neighboring cells via the X2 interface;

generating uplink HII information by the base station according to an uplink load, a downlink load, a resource subset utilization condition and power information of the cell, and sending the generated uplink HII information to the neighboring cells via the X2 interface;

step L6: making statistics of OI and HII information of each RB in the cell, processing all the OI and HII information sent from the neighboring cells, processing HII information generated by the cell, and acquiring OI and HII information available to the cell, wherein the OI information reflects the level of interference generated among specific neighboring cells or caused by the cell on a neighboring cell at each RB, and the HII information reflects the level of interference generated among specific neighboring cells or caused by a neighboring cell on the cell at each RB;

step L7: predetermining a cell load threshold, calculating a load of the cell, comparing the load of the cell with the predetermined cell load threshold to determine whether the former is greater than the latter, if the former is greater than the latter, turning to steps L81 and L82 synchronously, otherwise, turning to step L81 directly;

step L81: adjusting the ratio of the cell-center users to the cell-edge users in the cell according to an interference level of each RB, the actual ratio of cell-edge users to cell-center users and resource subsets available to the edge area and those to the center area;

specifically, this step is to allocate resource subsets with an interference level higher than the predetermined interference level threshold to the cell-center users in the cell and those with an interference level lower than the predetermined interference level threshold to the cell-edge users in the cell;

in this step, the ratio of the resource subsets used for the cell-center users to those used for the cell-edge users in the cell can also be adjusted according to the aforementioned information, and resource subsets with an interference level higher than the predetermined interference level threshold are allocated to the cell-center users in the cell and those with an interference level lower than the predetermined interference level threshold are allocated to the cell-edge users in the cell, and then step L9 is executed, the adjustment on the number ratio or resource ratio of the cell-center users to the cell-edge users in the cell is performed at a relatively intermediate speed;

step L82: performing a dynamic control on uplink transmission powers of corresponding resource subsets of cell-center users and cell-edge users corresponding to available OI information;

dynamically controlling the uplink transmission power to control the level of interference caused by the cell on a neighboring cell to be within a certain range comprises the following steps of: lowering the transmission power of an RB whose interference level is indicated by OI higher than the predetermined interference level threshold, slightly increasing the transmission power of an RB whose interference level is indicated by OI lower than the predetermined interference level threshold, and then turning to step L9;

the method for inter-cell interference coordination provided herein also needs to make a corresponding MCS adjustment to match power changes while adjusting a transmission power, so as to achieve a self-adaptation to a wireless link;

and step L9: scheduling users and performing a time-frequency resource allocation for the users according to available HII information;

cell-edge users first call resource subsets in $OC_{RB}$ and then those in $\overline{HII_{RB}}^u$, and cell-center users first call resource subsets in $IC_{RB}$, then those in $OC_{RB}$ and finally those in $BC_{RB}$, wherein the $OC_{RB}$ represents a set of RBs of the cell-edge users;

the $BC_{RB}$ represents a set of RBs the cell-center users can borrow;

the $IC_{RB}$ represents a set of RBs dedicated to the cell-center users;

$HII_{RB}{}^{cellId}$ represents a set of RBs corresponding to BIT '1' in HII sent from a source cell (cellId) to the cell;

$\{cellId_u\}$ represents a set of cellIds of neighboring cells of $UE_u$, then $$HII_{RB}^u = \bigcup_{cellId \in \{cellId_u\}} HII_{RB}^{cellId}.$$

CEU strategy: $OC_{RB} \cup \overline{HII_{RB}{}^u}$, the total number <= the number of elements in $OC_{RB} \cup HII_{RB}{}^u$;

CCU strategy: $IC_{RB} \cup OC_{RB} \cup BC_{RB}$;

and CEU strategy: $OC_{RB} \cup HII_{RB}{}^u$.

The method for inter-cell interference coordination provided herein effectively lowers the level of inter-cell interference to an ideal balanced state, improves the overall capacity and the coverage performance of a system and provides an OFDM system with a better service capability by acquiring interfered resource subsets from a cell and the level of interference on resource subsets according to the level of inter-cell interference, adjusting the resource subsets allocated to the users in the cell, and adjusting the power upper limit difference between the resource subsets corresponding to the cell-center users and the cell-edge users in the cell according to the changing trends of interferences respectively caused by the cell-center users and the cell-edge users in a neighboring cell on the cell when the load of the cell exceeds a load threshold.

It should be appreciated that the above-mentioned embodiments are only preferred ones of the present disclosure but not to be construed as limiting the scope of the present disclosure, and that any equivalent structure or flow modification devised without departing from the content disclosed in the specification or accompanying drawings and any direct or indirect application of the present disclosure to other related technical fields belong to the protection scope of the present disclosure.

The invention claimed is:

1. A method for inter-cell interference coordination, comprising:

classifying users in a cell into cell-edge users and cell-center users, and allocating frequency resources to the cell-edge users and the cell-center users;

acquiring an interference level of frequency resources in the cell according to inter-cell interference and recording a changing trend of interference caused by a neighboring cell on the cell; and coordinating inter-cell interference according to the interference level of the frequency resources in the cell and the changing trend of the interference caused by the neighboring cell on the cell, wherein the classifying users in a cell into cell-edge users and cell-center users and allocating frequency resources to the cell-edge users and the cell-center users further comprises:

dividing the frequency resources in the cell into a plurality of resource subsets, allocating one resource subset to each cell-edge user and allocating remaining resource subsets to the cell-center users, wherein the number of the resource subsets is not smaller than that of sectors in the cell, wherein the coordinating inter-cell interference further comprises:

calculating a load of the cell and comparing the load of the cell with a predetermined cell load threshold;

adjusting the resource subsets in the cell and a power upper limit difference between the resource subsets corresponding to the users in the cell when the load of the cell is greater than the predetermined cell load threshold, according to users in both cell-edge and cell-center, wherein the adjusting the resource subsets in the cell and a power upper limit difference between the resource subsets corresponding to the users in the cell when the load of the cell is greater than the predetermined cell load threshold comprises:

allocating, when an interference level of a resource subset allocated to a user is higher than a predetermined interference level threshold of the resource subset, a resource subset with an interference level lower than the predetermined interference level threshold to the user corresponding to the resource subset with an interference level higher than the predetermined interference level threshold; and adjusting a power upper limit difference between the resource subsets corresponding to the cell-center users and the cell-edge users in the cell according to a changing trend of interference caused by cell-center users of the neighboring cell on the cell and a changing trend of interference caused by cell-edge users of the neighboring cell the cell.

2. The method for inter-cell interference coordination according to claim 1, wherein the coordinating inter-cell interference further comprises:

adjusting the resource subsets in the cell when the load of the cell is not greater than the predetermined cell load threshold.

3. The method for inter-cell interference coordination according to claim 2, wherein the adjusting the resource subsets in the cell when the load of the cell is not greater than the predetermined cell load threshold comprises:

allocating, when an interference level of a resource subset allocated to user is higher than a predetermined interference level threshold of the resource subset, a resource subset with an interference level lower than the predetermined interference level threshold to the user corresponding to the resource subset with an interference level higher than the predetermined interference level threshold.

4. A base station for implementing inter-cell interference coordination, comprising:

a processor; and a memory, coupled to the processor, and including instructions that when executed, cause the processor to perform the following:

classifying users in a cell into cell-center users and cell-edge user;

allocating frequency resources to the cell-edge users and the cell-center users, acquire an interference level of the frequency resources in the cell according to inter-cell interference, and record a changing trend of interference caused by a neighboring cell on the cell;

adjusting the frequency resources in the cell according to the interference level of the frequency resources in the cell; and adjusting a power upper limit difference between resource subsets of the users in the cell according to the changing trend of the interference caused by the neighboring cell on the cell dividing the frequency resources in the cell into a plurality of resource subsets and allocate one resource subset to each cell-edge user and allocate remaining resource subsets to the cell-center users, wherein the number of the resource subsets is not smaller than that of sectors in the cell;

predetermining a cell load threshold and comparing a load of the cell with the predetermined cell load threshold;

allocating, when an interference level of a resource subset allocated to user is higher than a predetermined interference level threshold of the resource subset, a resource subset with an interference level lower than the predetermined interference level threshold to the user corresponding to the resource subset with an interference level higher than the predetermined interference level threshold; and adjusting a power upper limit difference between the resource subsets corresponding to the cell-center users and the cell-edge users in the cell according to a changing trend of interference caused by cell-center users of the neighboring cell on the cell and a changing trend of interference caused by cell-edge users of the neighboring cell on the cell.

5. The base station for implementing inter-cell interference coordination according to claim 4, wherein the base station is further configured to predetermine interference level thresholds for the resource subsets and compare an interference level of a resource subset with the predetermined interference level threshold.

6. The base station for implementing inter-cell interference coordination according to claim 5, wherein the base station is further configured to allocate a resource subset with an interference level lower than the interference level threshold to a user corresponding to a resource subset with an interference level higher than the interference level threshold.

* * * * *